United States Patent [19]
Campanella et al.

[11] 3,836,734
[45] Sept. 17, 1974

[54] ADAPTIVE ECHO CANCELLER WITH MULTI-INCREMENT GAIN COEFFICIENT CORRECTIONS

[75] Inventors: Samuel J. Campanella, Gaithersburg; Henri G. Suyderhoud, Potomac; Michael Onufry, Jr., Gaithersburg, all of Md.

[73] Assignee: Communications Satellite Corporation, Washington, D.C.

[22] Filed: Dec. 3, 1971

[21] Appl. No.: 204,507

[52] U.S. Cl. .......... 179/170.2
[51] Int. Cl. .......... H04b 3/20
[58] Field of Search .......... 179/170.2; 307/235

[56] References Cited

UNITED STATES PATENTS

| | | | |
|---|---|---|---|
| 3,400,279 | 9/1968 | Grant | 307/235 |
| 3,458,721 | 7/1969 | Maynard | 307/235 |
| 3,465,106 | 9/1969 | Nagata et al | 179/170.2 |
| 3,499,999 | 3/1970 | Sondhi | 179/170.2 |
| 3,500,000 | 3/1970 | Kelly et al | 179/170.2 |
| 3,632,905 | 1/1972 | Thomas et al. | 179/170.2 |
| 3,732,410 | 5/1973 | Mackechnie | 179/170.2 |

*Primary Examiner*—Kathleen H. Claffy
*Assistant Examiner*—Alan Faber
*Attorney, Agent, or Firm*—Sughrue, Rothwell, Mion, Zinn & Macpeak

[57] ABSTRACT

Disclosed herein is an improved adaptive echo canceller including an adaptive control loop for modifying the coefficients of the impulse response values used in performing the digital convolution. The adaptive control loop includes a multi-increment threshold detector producing a plurality of different control signals corresponding to different residual echo signals, e(t), realized by subtracting a synthesized echo from the real echo. An adder, responsive to the different control signals, modifies the coefficients by different amounts corresponding to the plurality of increments.

8 Claims, 6 Drawing Figures

INVENTORS
SAMUEL J. CAMPANELLA
HENRI G. SUYDERHOUD
MICHAEL ONUFRY JR.

BY Sughrue, Rothwell, Mion, Zinn & Macpeak
ATTORNEYS

ADAPTIVE ECHO CANCELLER WITH MULTI-INCREMENT GAIN COEFFICIENT CORRECTIONS

BACKGROUND OF THE INVENTION

The invention is in the field of echo cancellers and in particular is an improved echo canceller.

It is well known that hybrid circuits connecting two wire to four wire circuits do not provide echo-free coupling between the receive and send lines of the four wire circuit. A portion of the signal, typically voice signals, on the receive line will pass to the send line and appear as an echo signal. When the four wire system is used for long distance communications, such as via a submarine cable or a communications satellite, the echo signals can be particularly disturbing.

Echo suppressors are commonly used for removing the echo caused by imperfection in the hybrid or other echo path by attenuating the send line signal. One class of such suppressors operates to interrupt the send line whenever a voice level signal is detected on the receive line. This will eliminate echo but will also eliminate voice signals emanating from the local two wire circuit and therefore clip the outgoing conversation. A double talk detector is conventionally used to reduce interruption of the send line, normally caused by voice signals on the receive line, when voice signals are simultaneously emanating from the two wire circuits, i.e., speakers at both ends are talking simultaneously. However, if the speaker at the local two wire circuit is speaking softly relative to the speaker at the far end, the larger voice signal on the receive line may prevent operation of the double talk detector and thus the send line will be interrupted thereby clipping the speech on the send line. When the double talk detector does operate correctly, the echo will not be prevented during double talk, but is transmitted along with the near talker speech.

A newer class of devices for handling the echo problem is known as echo cancellers. An echo canceller does not interrupt the send line but generates an approximation, $y(t)$, of the echo $y(t)$, and subtracts the former from the signal appearing on the send line. The remaining signal on the send line during double talk is $S(t)+e(t)$, where $S(t)$ is the local voice signal and $e(t)$ is the residual error caused by $y(t)$ not being exactly eqaul to $y(t)$.

The basis of operation of echo cancellers is that the echo path may be regarded as a filter and satisfies the relation:

$$y(t)=\int_0^\infty f(t-\tau)k(\tau)d\tau,$$

where $f(t)$ is the signal applied to the echo path, $k(t)$ is the impulse response of the echo path, and $y(t)$ is the echo.

In one paticular implementation of the above equation, digital circuits are used. An X memory stores digitized samples of the incoming signal $X(t)$ over a period T, and an H register stores a digital representation of the impulse response of the echo path. Both memories recirculate, but the oldest sample in the X memory is replaced, each sample period, by a new sample of the signal $X(t)$. Digital convolution is performed on the contents of the two memories - the contents are multiplied, sample by sample, and the products summed- resulting in an approximation y(t) of the echo. In one case, the impulse response of the echo path is stored in the H memory bu using the search or interrogating pulse technique. That is, after the circuit is set up between caller and called stations, but before conversation begins, an artifical search or interrogating pulse is applied to the receive line. The pulse passes through the echo path and the resultant signal on the send line is the impulse response of the echo path. The impulse response is sampled over the period T, digitized and stored in the H register.

For a number of reasons, including the fact that the impulse response of the echo path may not be constant, the search pulse technique is not satisfactory. More recent cancellers continuously compute an impulse response that minimizes the mean squared error between $y(t)$ and y(t). Specifically the circuitry includes an adaptive control loop, responsive to the residual error, $e(t)$ and the receive side signal $x(t)$, for implementing the steepest-descent technique by adjusting the N samples of the H memory through incrementing or decrementing each sample by a given amount. After convergence, i.e., attainment of minimum error or echo, the contents of the H memory represent, in digital form, the impulse response of the echo path. The time of convergence and amplitude of residual echo, $e(t)$, are important characteristics in any echo canceller.

SUMMARY OF THE INVENTION

The present invention improves the time of convergence of a convergence type echo canceller by producing variable increments or decrements for adjusting the N samples of the H memory in response to the magnitude of the residual error, $e(t)$. Since large error signals produce greater increments or decrements than smaller error signals, the speed of convergence is increased. The variable step size proportional to the error technique of the present invention also maintains the stability of the convergence process, since that depends ultimately on the ratio of the smallest step size to the values of the impulse response samples.

The above is accomplished by including in the adaptive control loop a multi-increment threshold detector producing different threshold control signals each representing a different magnitude residual echo $e(t)$. A bilateral adder in response to the plurality of signals, modifies each sample in the H memory by the varying amounts.

DETAILED DESCRIPTION OF THE DRAWINGS

Figure 1:
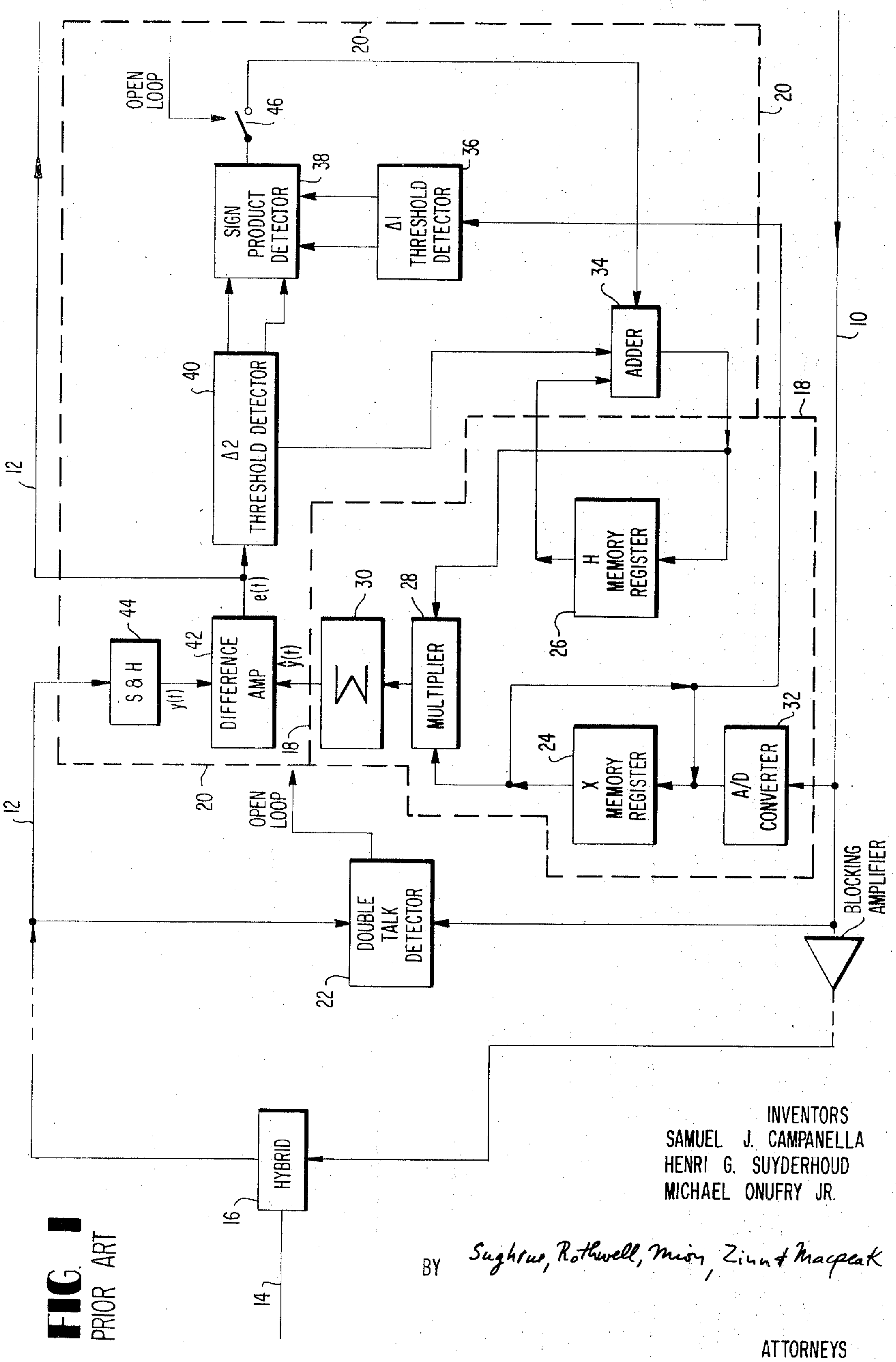
FIG. 1 PRIOR ART
FIG. 1 is a block diagram of a prior echo canceller.

FIG. 1 represents an echo canceller of the prior art type. The four wire circuit comprising receive line 10 and send line 12 is connected to the two wire circuit 14 by hybrid circuit 16. The echo path is defined as that path from the receive-out side via hybrid 16 to the send-in side of the echo canceller. The two major components of the canceller are a digital transversal filter 18 and adaptive control loop 20.

The digital transversal filter, 18, comprises; an analog to digital converter 32 which samples the incoming signal X($t$) at the Nyquist rate and converts each sample into an m-bit digital word; an X memory register which stores N samples of X, $X_1$ through $X_N$, and recirculates once each sample period; a H memory register 26 which stores N digital words, $h_1$ through $h_N$ representing the echo path impulse response; a multiplier 28 for multiplying $X_i$ by $h_i$ and a summation circuit, 30, for summing the multiplier output over the sample period. The output of the summation circuit, 30, is an approximation $y(t)$ of the echo $y(t)$.

The H memory 26 is initially at $h_i = 0$ for $i = 1, 2, 3, \ldots N$. Digital convergence is provided by the adaptive control loop, 20, which comprises: a sample and hold circuit 44, for sampling the echo $y(t)$, appearing on the send line 12; a difference amplifier 42 for receiving $y(t)$ and $y(t)$ and deriving the residual echo, $e(t)$; a Δ2 threshold circuit, 40, for determining if e(t) is above a minimum amplitude Δ2 and for providing an output indicating the sign of $e(t)$ when $e(t)$ exceeds the threshold a Δ1 threshold circuit 36 for detecting if $X_i$ exceeds the threshold Δ 1 and for providing an indication of the sign of $X_i$ when the threshold is exceeded; a sign product detector, 38, for providing an output indicative of the sign product of $X_i$ and $e(t)$; and an adder, 34, for adding or subtracting an incremental amount, $\Delta h_i$, to the sample $h_i$ to form the new sample $h_i^* = h_i \pm \Delta h_i$.

In order to prevent the adaptive control loop from responding to S($t$) + $e(t)$, which will occur when S($t$) and X($t$) occur simultaneously, a conventional double talk detector 22 may be used. The detector 22 is not used in the conventional manner to interrupt the send line, but is used to open the adaptive control loop as indicated generally at 46. It will be noted that when the adaptive control loop 20 is opened, the signal $y(t)$ continues to be subtracted from S($t$) + $y(t)$; however, the H memory is not updated.

In prior echo cancellers such as the one illustrated in FIG. 1, the incremental amount, $\Delta h_i$ is a constant value notwithstanding variations in the value of $e(t)$. To increase the rate of convergence the present invention modifies the prior echo canceller to provide a variable increment $\Delta h_i$ in response to varying values of $e(t)$.

Figure 2:
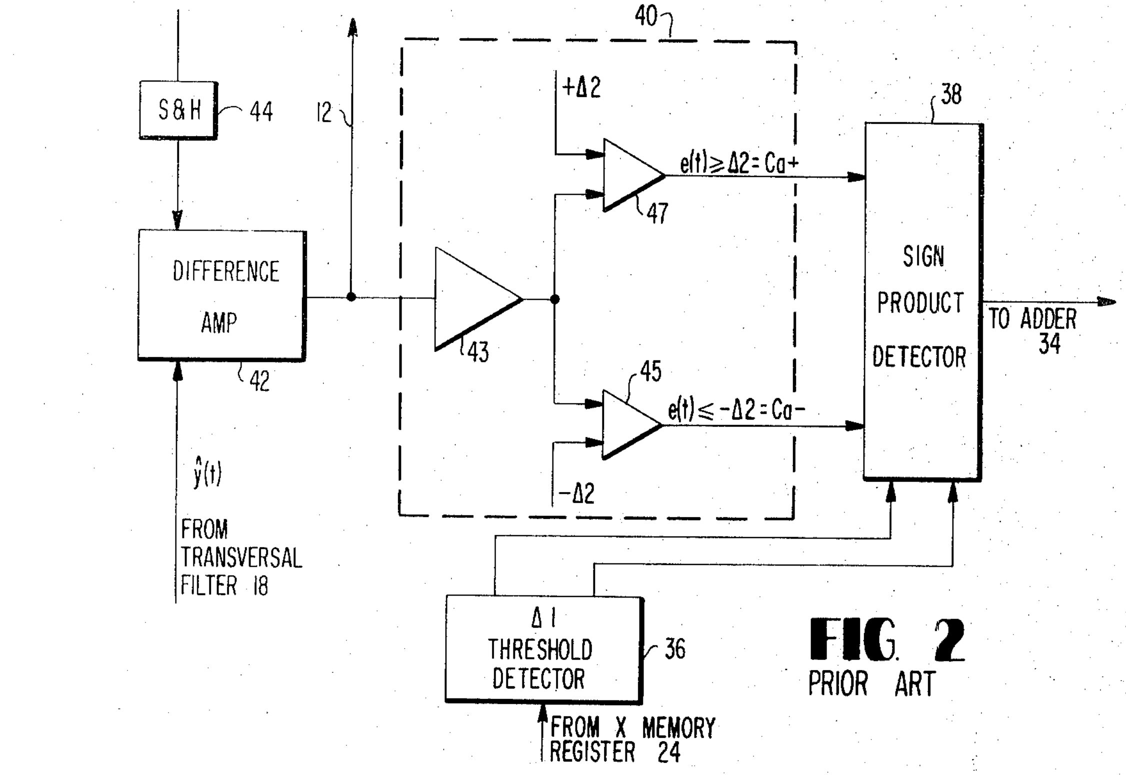
FIG. 2 PRIOR ART
FIG. 2 is a diagram of the adaptive control loop of the echo canceller of FIG. 1 including detail of a threshold detector.

FIG. 2 illustrates a portion of the FIG. 1 canceller showing the Δ2 threshold detector 40 in greater detail. The residual error $e(t)$ is amplified in amplifier 43 and compared against a preselected value ±Δ2 to determine if $e(t)$ Δ2. If it is, one of the two outputs of detector 40 changes from a normal logic 0 to a logic 1. The particular output which rises depends upon whether the error is more positive than the threshold value Δ2 or more negative than the threshold value −Δ2. The output from the detector 40 in conjunction with the sign of the X register stages, detected at the output of Δ1 threshold detector 36, permits the incrementing of the N stages of the H register by a constant $\Delta h_i$ in accordance with the sign product of each of the $X_1 \ldots X_N$ samples and the error $e(t)$. If $e(t)$ is less than Δ2 no correction is made to the stored samples in the H register 26.

To implement the present invention the Δ2 threshold detection 40 is modified to provide at its output different threshold control signals $\Delta 2_a \ldots, \Delta 2_n$ and $-\Delta 2_a \ldots -\Delta 2_n$ corresponding to different values of $e(t)$. The adder 34 is modified to enable it to generate multi-increment corrections $\Delta h_a \ldots \Delta h_n$ in response to the control signals from the detector 40. Thus, depending upon the value of $e(t)$, the new sample $h_i^* = (h_i \pm \Delta h_a) + (h_i \pm \Delta h_b) + \ldots + (h_i \pm \Delta h_n)$ where the symbol + represents the "exclusive or" logic operation.

Figure 3:
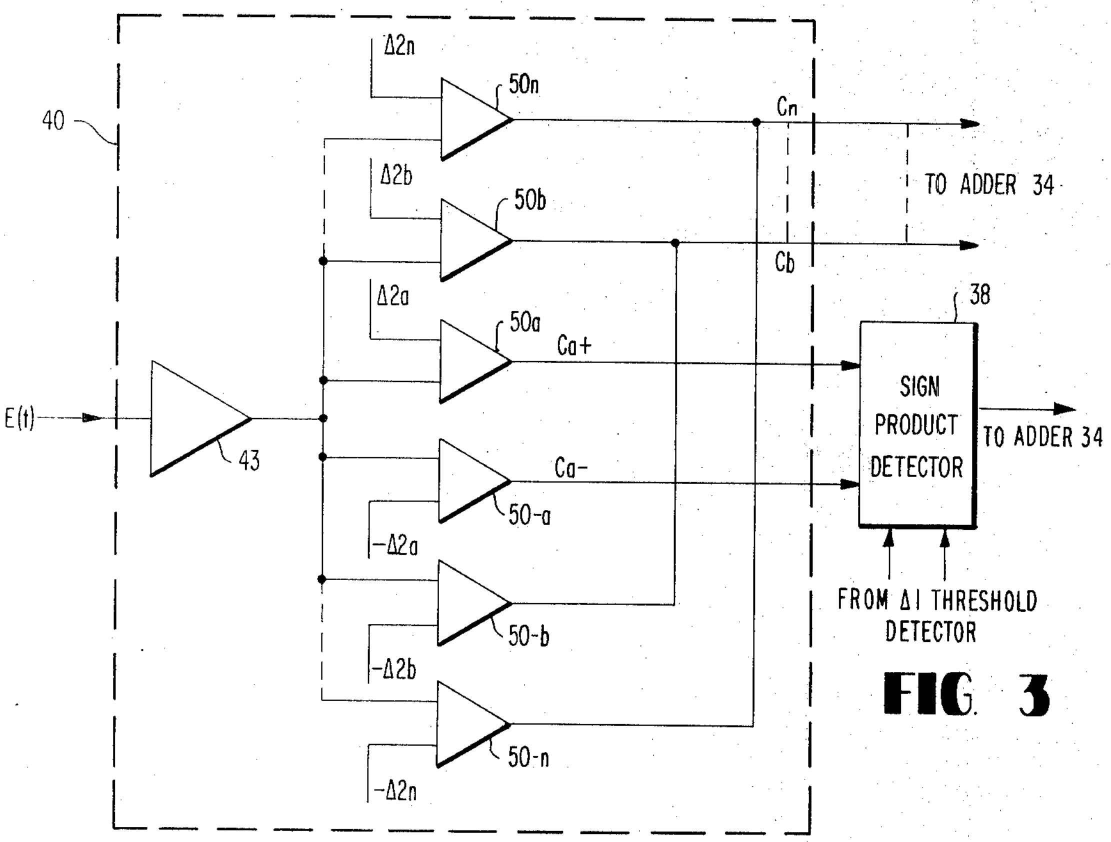
FIG. 3 is a diagram of the threshold detector of FIG. 2 modified in accordance with the present invention.

FIG. 3 illustrates the modification of Δ2 threshold detector 40 in accordance with the teachings of the invention. The minimum threshold $\Delta 2_a$ corresponds to the minimum amplitude level Δ2 in the prior detector of FIG. 2 while compare circuits $\mathbf{50}_a$ and $\mathbf{50}_{-a}$ correspond to circuits 47 and 45 respectively. The additional compare circuits $\mathbf{50}_b \ldots \mathbf{50}_n$ and $\mathbf{50}_{-b} \ldots \mathbf{50}_{-n}$ which, like compare circuits $\mathbf{50}_a$ and $\mathbf{50}_{-a}$ may be differential amplifiers, provide the additional threshold control signals. Since the minimum threshold $\pm\Delta 2_a$ is unchanged, no changes are required in the control loop logic for determining the sign of the correction. Further, only one signal is required indicating that each subsequent threshold level $\Delta 2_b, \ldots \Delta 2_n$ has been exceeded because the sign of the error is obtained from the outputs of circuits $\mathbf{50}_a$ and $\mathbf{50}_{-a}$. Thus, a single control line, $C_b \ldots C_n$, each carrying a single threshold control signal $C_b \ldots C_n$ is connected to each of the two corresponding compare circuits, $\mathbf{50}_b$ and $\mathbf{50}_{-b}$, $\mathbf{50}_c$ and $\mathbf{50}_{-c}$.., $\mathbf{50}_n$ and $\mathbf{50}_{-n}$. These control lines are routed to the adder 34 where they determine the increment $\Delta h_a \ldots \Delta h_n$ to be added to or subtracted from the impulse response coefficient $h_i$.

Figure 4:
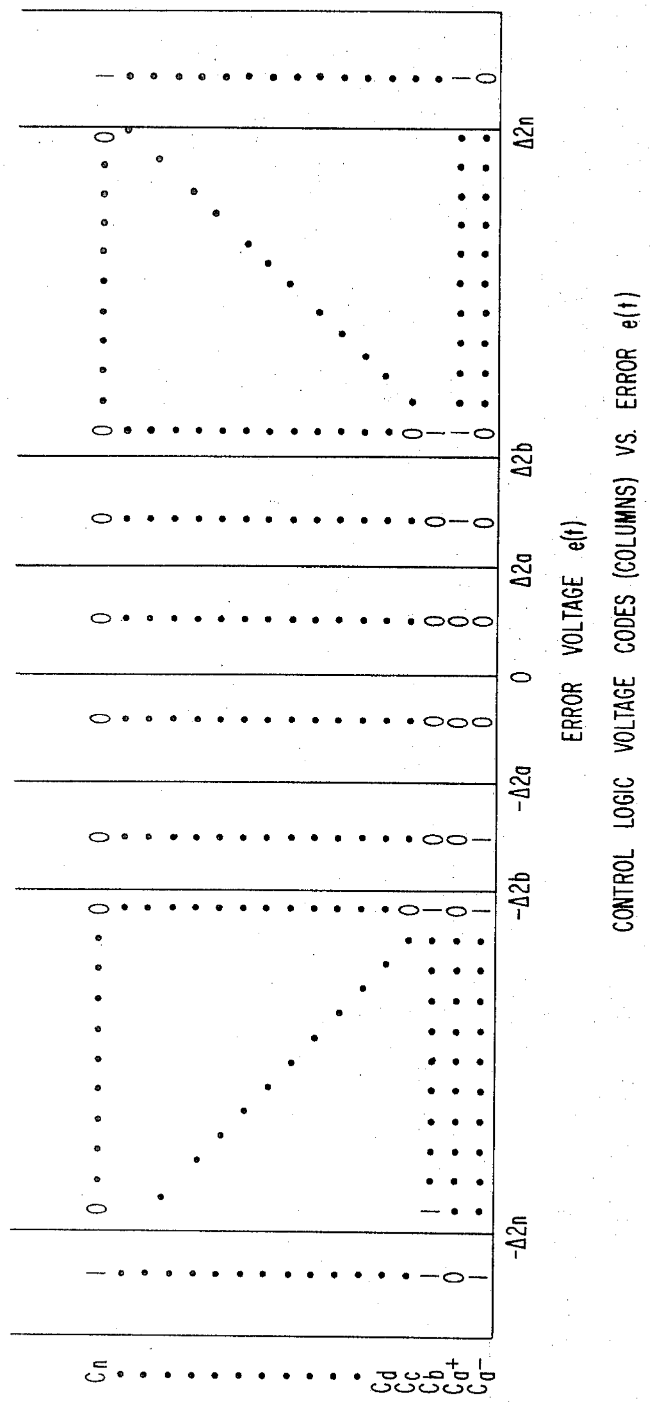
FIG. 4 is a table illustrating the control logic codes for different residual echo signals.

FIG. 4 illustrates the control logic code corresponding to different error voltage $e(t)$ in terms of the threshold levels $\Delta 2_a \ldots \Delta 2_n$. As will be explained in detail with reference to FIG. 5 the adder receives these codes and uses them to select the size of the corresponding increment.

Figure 5:
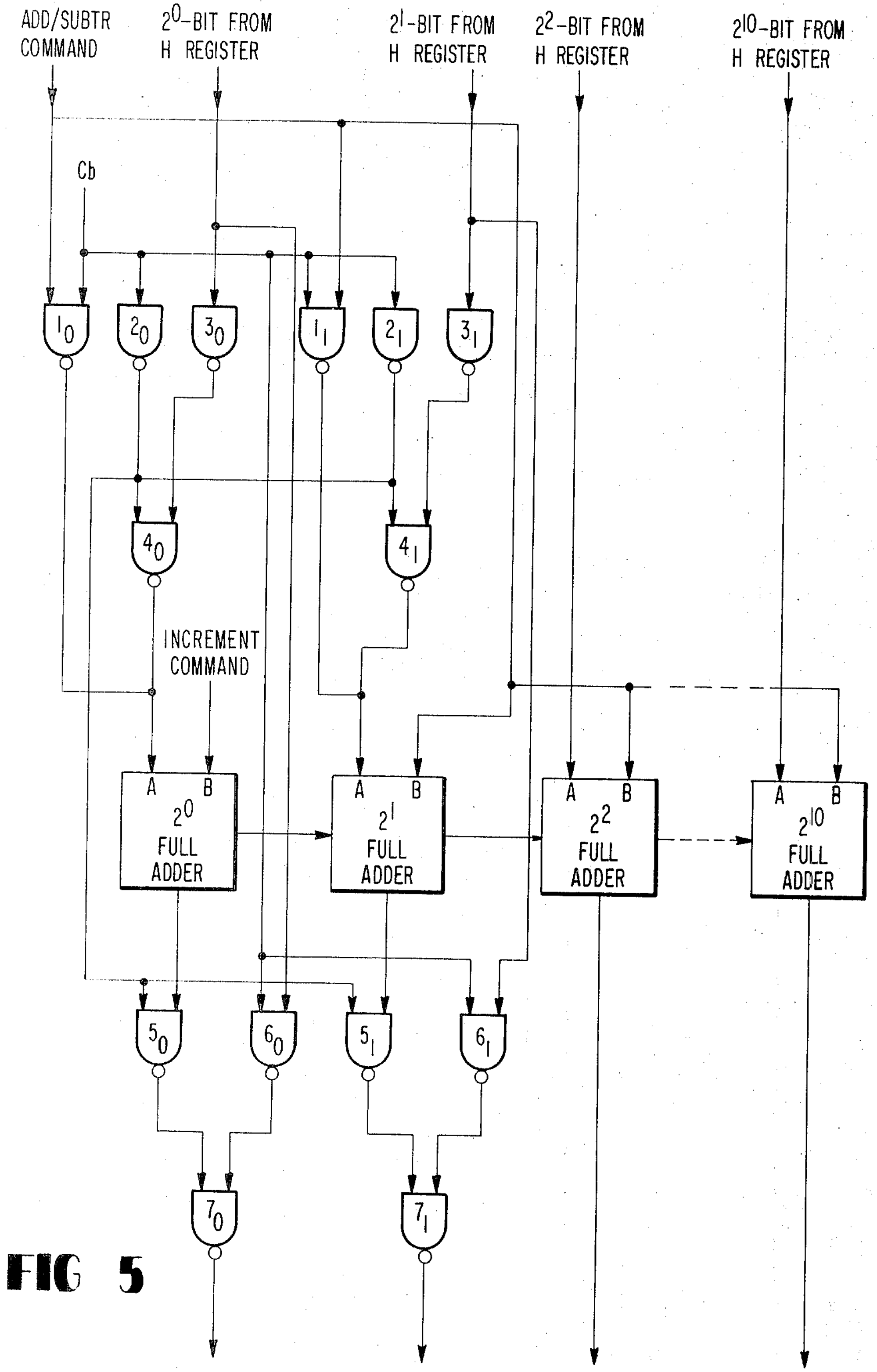
FIG. 5 is a diagram of the adder shown in FIG. 1 modified in accordance with the teachings of the invention to provide two increment levels.

FIG. 5 is one illustration of adder 34 modified in accordance with the teachings of the invention. The conventional adder as used in the echo canceller of FIG. 1 receives a coded word of, for example, 11 bits representing each $h_i$ impulse response coefficient from the H register 26. An increment command signal under the direction of the Δ2 threshold detector 40 output is applied to the B input of the $\mathbf{2^0}$ adder stage, the A inputs of stages $\mathbf{2^0 \ldots 2^{10}}$ receiving the eleven bit $h_i$ code word. The B inputs of the $\mathbf{2^1 \ldots 2^{10}}$ stages are tied together and receive the add or subtract command from the sign product detector 38 on the ADD/SUBTR COMMAND line. A logic 1 to the B inputs of stages $2^1 \ldots 2^{10}$ orders a subtraction operation and a two's complement addition is performed.

The adder structure of FIG. 5 emphasizes the modifications according to the teachings of the invention while conventional, unmodified portions of the adder have been deleted to avoid confusion.

The circuitry of FIG. 5 provides $\Delta h$ increments of either one part in $\mathbf{2^{11}}$ or four parts in $\mathbf{2^{11}}$ depending upon whether the $c_b$ control signal is raised to a logic 1 or not. Assuming the gain coefficient $h_i = 1$, the 11 bit lines coupled to the H register 26 receive the code word 10000000000. The $c_b$ input from the Δ2 detector is normally at a logic 0. A logic 0 from the sign product detector 38 indicates an ADD command and appears on the ADD/SUBTR COMMAND line. The B input of the $2^0$ adder stage is coupled to the Δ2 threshold detector 40 and is at a logic 1 whenever the error $e(t)$ $\Delta 2_a$. Specifically, the B input of $2^0$ adder stage can be coupled to lines $C_a$ and $C_{-a}$.

Assuming that the error $e(t)$ satisfies $\Delta 2_a$ $e(t)$ $\Delta 2_b$ and that the sign product detector indicates that an ADD operation is required, the $C_b$ control line remains at a logic 0 as does the ADD/SUBTR COMMAND line, while the B input to the $2^0$ stage goes to a logic 1. The gates $1_0 - 7_0$ and $1_1 - 7_1$ are NAND gates. NAND gate pairs $1_0$, $4_0$ and $1_1$, $4_1$ are wired in an OR configuration such that a logic 0 output from either of the gates in a pair override a logic 1 output from the other gate.

Thus, gates $1_0$ and $1_1$ are disabled causing a logic 1 to appear at their outputs. In the example given, a logic 1 appears at the input to gate $3_0$ which appears as a logic 1 at the output of gate $4_0$. The logic 1 at the A and B inputs of the $2^0$ stage generates a 1 carry to the $2^1$ stage.

Considering the $2^1$ stage, the assumed logic 0 at the input of gate $3_1$ appears as a logic 0 at the output of gate $4_1$. This logic 0 overrides the logic 1 from gate $1_1$ to supply a logic 0 to the A input of the $2^1$ stage. The B input, being tied to the ADD/SUBTR COMMAND line is also at a logic 0 and thus a logic 1 appears at the output of the $2^1$ stage.

To avoid destroying the accuracy of the $h_i$ coefficients, the $2^0$ and $2^1$ bits from the H register 26 must be gated around the $2^0$ and $2^1$ stages of the adder when the $C_b$ command line is a logic 1. When the $C_b$ line is at a logic 1, gates $5_0$ and $5_1$ are disabled through gates $2_0$ and $2_1$ to provide a constant logic 1 output to enable gates $7_0$ and $7_1$. Further, a logic 1 on the $C_b$ command line enables gates $6_0$ and $6_1$ to pass the $2^0$ and $2^1$ bits from the H register. When the $C_b$ line is at a logic 0, gates $6_0$ and $6_1$ are disabled and gates $5_0$ and $5_1$ are enabled. This permits the operations on the $2^0$ and $2^1$ bits to provide the one part in $2^{11}$ increment in response to $\Delta 2_a$ $e(t)$ $\Delta 2_b$. Gates $7_0$ and $7_1$ invert the signals back to their proper phase. Thus, the logic 0 output from the $2^0$ stage is seen at the output of gate $7_0$ as a logic 0 while the logic 1 output from the $2^1$ stage appears at the output of gate $7_1$ as a logic 1. The input code word has now been incremented by one part in $2^{11}$. A similar analysis will show that a logic 1 on the ADD/SUBTR line will cause a two's complement addition, that is a subtraction, of one part in $2^{11}$.

A four part in $2^{11}$ increment to $h_i$ is developed when the $C_b$ line is raised to a logic 1. The rising of the $C_b$ line, as previously indicated disables gates $5_0$ and $5_1$ and provides a path for the $2^0$ and $2^1$ bits of the $n_i$ sample by enabling gates $6_0$ and $6_1$. Further, the raising of line $C_b$ disables gates $4_0$ and $4_1$ to provide a constant logic 1 at the output thereof while gates $1_0$ and $1_1$ are enabled to respond to the signal on the ADD/SUBTR COMMAND line. If an ADD signal is sent by the sign product generator 38 in the from of a logic 0, gates $1_0$ and $1_1$ supply logic 1's to the A inputs of stages $2^0$ and $2^1$ of the adder. This causes the B input of the $2^0$ stage to propagate to the $2^2$ stage and increase $h_i$ by four counts. If the ADD/SUBTR line is at a logic 1 the output of gates $1_0$ and $1_1$ are logic 0's overriding the outputs of gates $4_0$ and $4_1$ forcing the A inputs of the $2^0$ and $2^1$ stages of the adder to a logic 0.

The two's complement addition now causes $h_i$ to be decreased by four counts.

As a specific example, let it be assumed that the H register word at the adder input is the digital word 10110000000 which corresponds to the number 13 and that a subtraction is to be performed. The final result should be 13−4=9 or 10010000000. A logic 1 appears on the ADD/ SUBTR COMMAND line and the B input of the $2^0$ stage rises to a logic 1 indicating that a correction is to be made. Further the $C_b$ command line from the Δ2 threshold detector 40 is raised to a logic 1 indicating the magnitude of the correction to be made. Since a logic 1 is on the $C_b$ line, gates $5_0$ and $5_1$ are disabled while gates $6_0$ and $6_1$ are enabled to pass the value of the $2^0$ and $2^1$ bits. Further, since both inputs to gates $1_0$ and $1_1$ are logic 1's the outputs from these gates are logic 0's. The $C_b$ signal is inverted by gate $2_0$ and disables gate $4_0$ causing a constant logic 1 output. Since gates $1_0$ and $4_0$ are wired in the OR configuration the logic 0 output of gate $1_0$ overrides the logic 1 of gate $4_0$ to provide a logic 0 at the A input of stage $2^0$. Similarly a logic 0 appears at the A input of stage $2^1$. Thus, the adder input stages appear as follows:

| | $2^0$ | $2^1$ | $2^2$ | $2^3$ | $2^4$ | $2^5$ | $2^6$ | $2^7$ | $2^8$ | $2^9$ | $2^{10}$ |
|---|---|---|---|---|---|---|---|---|---|---|---|
| B Inputs | 1 | 1 | 1 | 1 | 1 | 1 | 1 | 1 | 1 | 1 | 1 |
| A Inputs | 0 | 0 | 1 | 1 | 0 | 0 | 0 | 0 | 0 | 0 | 0 |
| Sum | 1 | 1 | 0 | 1 | 0 | 0 | 0 | 0 | 0 | 0 | 0 |

Since gates $5_0$ and $5_1$ are disabled the $2^0$ and $2^1$ adder stage outputs are blocked while gates $7_0$ and $7_1$ are enabled to pass the 1, 0 states of the $2^0$ and $2^1$ bits respectively. The final result of the subtraction is the logic word 10010000000 which equals 9, the expected result.

The above circuitry, consisting of gates 1–7 and their interconnecting lines, must be added only to those stages receiving bits that are less significant than the larges Δ *h* increment desired. In this example since the largest $\Delta h = 4 = 2^2$ only the $2^0$ and $2^1$ adder stages were modified.

Figure 6:
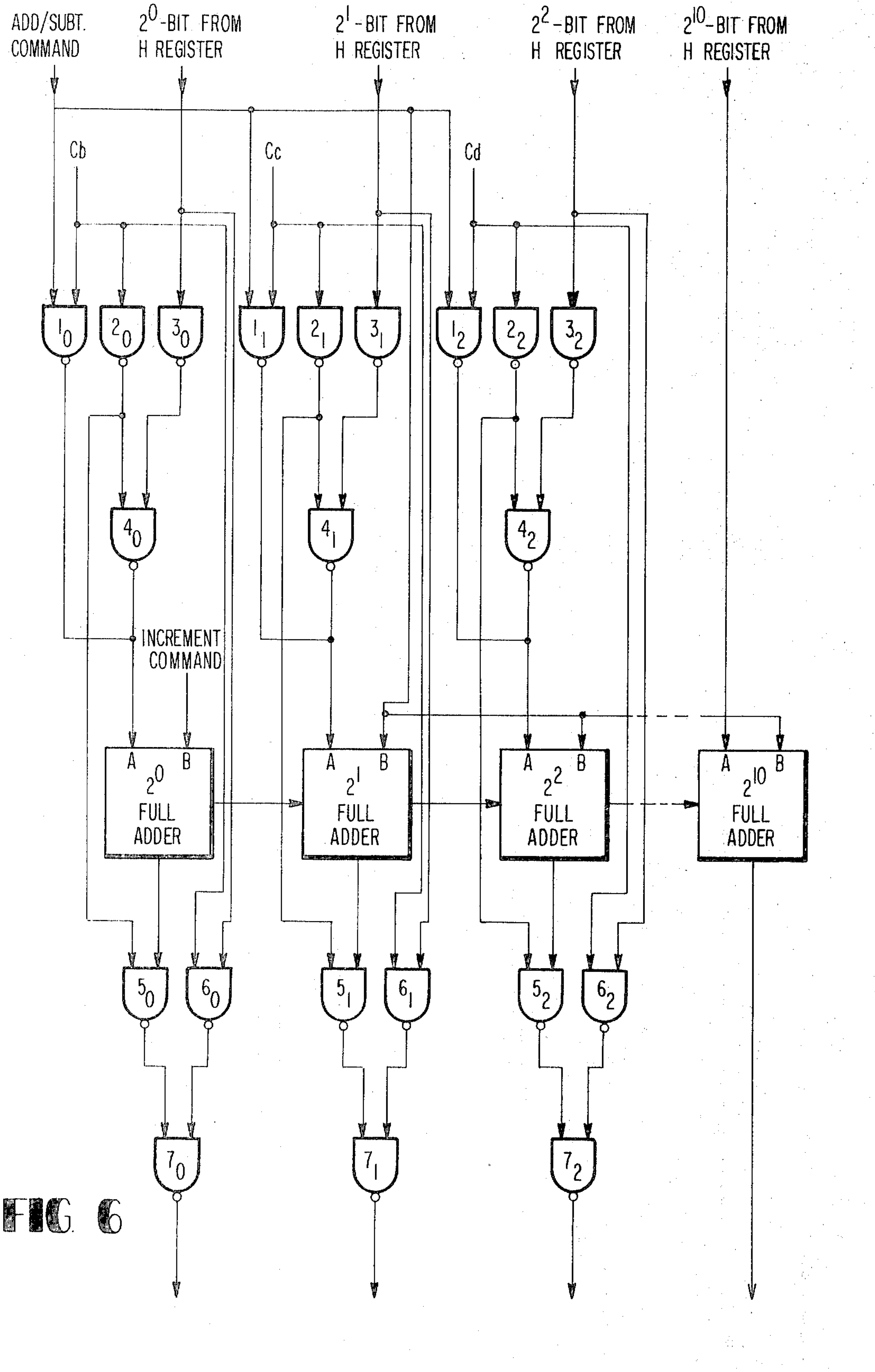
FIG. 6 is a diagram of the adder shown in FIG. 1 modified in accordance with the teachings of the invention to provide three increment levels.

FIG. 6 illustrates a modified adder capable of providing $\Delta h$ increments of 1, 2, 4 and 8. The added gates 1–7 are associated only with stages $2^0$, $2^1$ and $2^2$ since the largest $\Delta h$ increment is $2^3 = 8$. Operation of this modified adder requires inputs from the $C_c$ and $C_d$ control signal lines from the Δ2 threshold detector 40 in addition to the $C_b$ input and the increment command input representing an error $e(t)$ $\Delta 2_a$. Operation of the circuit is identical to that of the circuit in FIG. 5.

Further increments of $\Delta h$ may be provided by duplicating the disclosed logic in association with additional stages of the adder.

While the invention has been disclosed and claimed with respect to the preferred embodiments thereof, it will be understood by those skilled in the art that various changes in form and details may be made therein without departing from the sprit and scope of the invention.

What is claimed is:

1. A digital transversal adaptive echo canceller of the type having means for storing a fixed number of most recent samples of a received signal, means for storing a corresponding fixed number of estimated impulse response coefficients, digital convolution means responsive to said stored samples and said stored coefficients for generating an approximate echo signal, means for subtracting said approximate echo signal from a real echo signal thereby producing a residual echo, and adaptive control loop means responsive to said residual echo and said stored samples for adding incremental values to said stored coefficients respectively, the improvement being in said adaptive control loop means and comprising, a. multi-level threshold detector means responsive to the magnitude of said residual echo for generating output signals indicating the signal of said residual echo and the number of predetermined discrete threshold levels equalled or exceeded by said residual echo, b. sign product detector means responsive to each said last mentioned sign indicating output signal and to the sign of each of said stored samples, respectively, for generating a sign product output signal which is the product of the sign of said residual echo and the sign of said stored sample, respectively, c. incremental adder means, responsive to each said sign product output signal and to each said output signal representing threshold levels equalled or exceeded, for adding to each said stored coefficient an incremental value having a sign which is the same as said respective sign product output signal and a magnitude dependent on the number of predetermined discrete threshold levels equalled or exceeded by said residual echo.

2. The echo canceller of claim 1 wherein said threshold detector means comprises a plurality of compare circuit means, each receiving the residual echo and one of a plurality of different level threshold signals, for generating respective threshold control signals when the magnitude of the received residual echo is greater than the respective threshold signals.

3. The echo canceller of claim 2 wherein said compare circuits are grouped in pairs, the compare circuits of each pair receiving respectively a positive threshold signal and a negative threshold signal of equal magnitude, the pair of compare circuits receiving the minimum magnitude threshold levels being coupled to said sign product detector.

4. The echo canceller of claim 3 wherein said incremental adder means includes;

a plurality of adder stages, each adapted to receive in common said sign product output signal and a respective bit of said stored coefficient, selected stages also being connected to receive at least one threshold detector output signal corresponding to a detected residual echo equal to or greater than second threshold level greater than said minimum threshold level.

5. The echo canceller of claim 4 wherein said selected stages correspond to those stages receiving bits of said stored coefficient, which bits are of less significance than the largest said incremental values.

6. The echo canceller of claim 5 wherein said stage receiving the least significant bit of said stored coefficient further includes increment command signal receiving means responsive to a threshold detector output indicating a residual echo equal to or greater than said minimum threshold level.

7. The echo canceller of claim 5 wherein said selected stages include logic means, including first gate means, for selectively blocking the output from its corresponding adder stage, said first gate means further receiving a corresponding bit of said stored coefficient and including means for selectively blocking said last mentioned bit from the output of said logic means.

8. The echo canceller of claim 7 wherein said logic means further includes second gate means coupled to receive said sign product output signal and a threshold detector output signal, and third gate means coupled to receive a bit of said stored coefficient and a threshold detector output signal, the outputs from said second and third gate means being coupled to one input of their associated adder stage, each adder stage possessing a second input, said second input of each stage, except the stage receiving the least significant bit of said coefficient, being being coupled to receive said sign product signal and said second input of the adder stage receiving the least significant bit of said coefficient being coupled to receive said increment command signal.

* * * * *

UNITED STATES PATENT OFFICE

CERTIFICATE OF CORRECTION

Patent No. 3,836,734 Dated September 17, 1974

Inventor(s) SAMUEL J. CAMPANELLA ET AL

It is certified that error appears in the above-identified patent and that said Letters Patent are hereby corrected as shown below:

PAGE 2

Column 3

Line 47, delete "y(t)" and insert --$\hat{y}(t)$--

Line 52, delete "e(t)" and insert --$|e(t)|$--

Line 56, delete "e(t)" and insert --$|e(t)|$--

Line 62, delete "e(t)Δ2" and insert --$|e(t)| \geq \Delta 2$--

Column 4

Lines 14 and 15, after "sample" the equation should read as follows:

$$--h_i^* = (h_i \pm \Delta h_a) \oplus (h_i \pm \Delta h_b) \oplus \ldots \oplus (h_i \pm \Delta h_n)--$$

Line 15, delete "+" and insert -- $\oplus$ --

Line 19, delete "$\Delta 2_a$" and insert --$|\Delta 2_a|$--

Line 20, delete "$\Delta_2$" and insert --$|\Delta_2|$--

Column 5

Lines 8 and 9, delete "e(t) $\Delta 2_a$" and insert --$|e(t)| \geq \Delta 2_a$--

Line 11, delete "$\Delta 2_a$ e(t)" and insert --$\Delta 2_a \leq |e(t)| \leq \Delta 2_b$--

Line 51, delete "$\Delta 2_a$ e(t) $\Delta 2_b$" and insert --$\Delta 2_a \leq |e(t)| \leq \Delta 2_b$--

UNITED STATES PATENT OFFICE
CERTIFICATE OF CORRECTION

Patent No. 3,836,734 Dated September 17,1974

Inventor(s) SAMUEL J. CAMPANELLA ET AL

It is certified that error appears in the above-identified patent and that said Letters Patent are hereby corrected as shown below:

PAGE 3

Column 5

Line 64, delete "$n_i$" and insert --$h_i$--

Column 6

Line 9, starting with "The two's complement . . . by four counts." should not start a new paragraph.

Line 47, delete"larges" and insert --largest--

Line 58, delete "$e(t)\ \Delta 2_a$" and insert --$|e(t)| \geq \Delta 2_a$--

Line 67, delete "sprit" and insert --spirit--

IN THE CLAIMS:

Claim 1 - Column 7

Line 17, delete "signal" and insert --sign--

Claim 4 - Column 8

Line 8, after "of" insert --a--

Claim 8 - Column 8

Line 42, delete "being" (first occurrence)

Signed and sealed this 4th day of March 1975.

(SEAL)
Attest:

RUTH C. MASON
Attesting Officer

C. MARSHALL DANN
Commissioner of Patents
and Trademarks

FORM PO-1050 (10-69)

USCOMM-DC 60376-P69
U.S. GOVERNMENT PRINTING OFFICE : 869-930